United States Patent [19]

Penzotti

[11] 3,999,800
[45] Dec. 28, 1976

[54] VEHICLE SEAT

[75] Inventor: Roger Paul Penzotti, Livermore, Calif.

[73] Assignee: Paccar Inc., Bellevue, Wash.

[22] Filed: May 1, 1975

[21] Appl. No.: 573,525

[52] U.S. Cl. .................. 297/345; 248/157; 248/399; 248/400; 297/367; 297/DIG. 3
[51] Int. Cl.² .................... A47C 3/30; F16M 11/00
[58] Field of Search ......... 297/313, 325, 326, 338, 297/345–347, DIG. 3, 354, 366–371; 248/157, 161, 371, 396–400; 267/113, 114

[56] References Cited

UNITED STATES PATENTS

| | | | |
|---|---|---|---|
| 2,310,476 | 2/1943 | Todd | 297/367 X |
| 2,714,001 | 7/1955 | Hersey et al. | 248/400 X |
| 2,936,818 | 5/1960 | Harrington et al. | 248/399 |
| 3,150,855 | 9/1964 | Carter et al. | 248/400 |
| 3,215,386 | 11/1965 | Swenson | 248/400 |
| 3,319,920 | 5/1967 | Freedman et al. | 248/399 |
| 3,335,996 | 8/1967 | Hall et al. | 248/400 |
| 3,593,953 | 7/1971 | Auer | 248/400 |
| 3,638,897 | 2/1972 | Harder, Jr. et al. | 248/400 |
| 3,641,838 | 2/1972 | Turner | 297/369 X |
| 3,711,149 | 1/1973 | Carter | 248/399 X |
| 3,902,757 | 9/1975 | Yoshimura | 297/367 |

FOREIGN PATENTS OR APPLICATIONS

| | | | |
|---|---|---|---|
| 2,108,624 | 8/1972 | Germany | 297/366 |
| 910,145 | 4/1954 | Germany | 297/313 |

Primary Examiner—Roy D. Frazier
Assistant Examiner—William E. Lyddane
Attorney, Agent, or Firm—Owen, Wickersham & Erickson

[57] ABSTRACT

An adjustable seat having air spring support and providing for pitch compensation and limitation, automatic maintenance of height adjustment, and rapid and economical back inclination adjustment.

21 Claims, 16 Drawing Figures

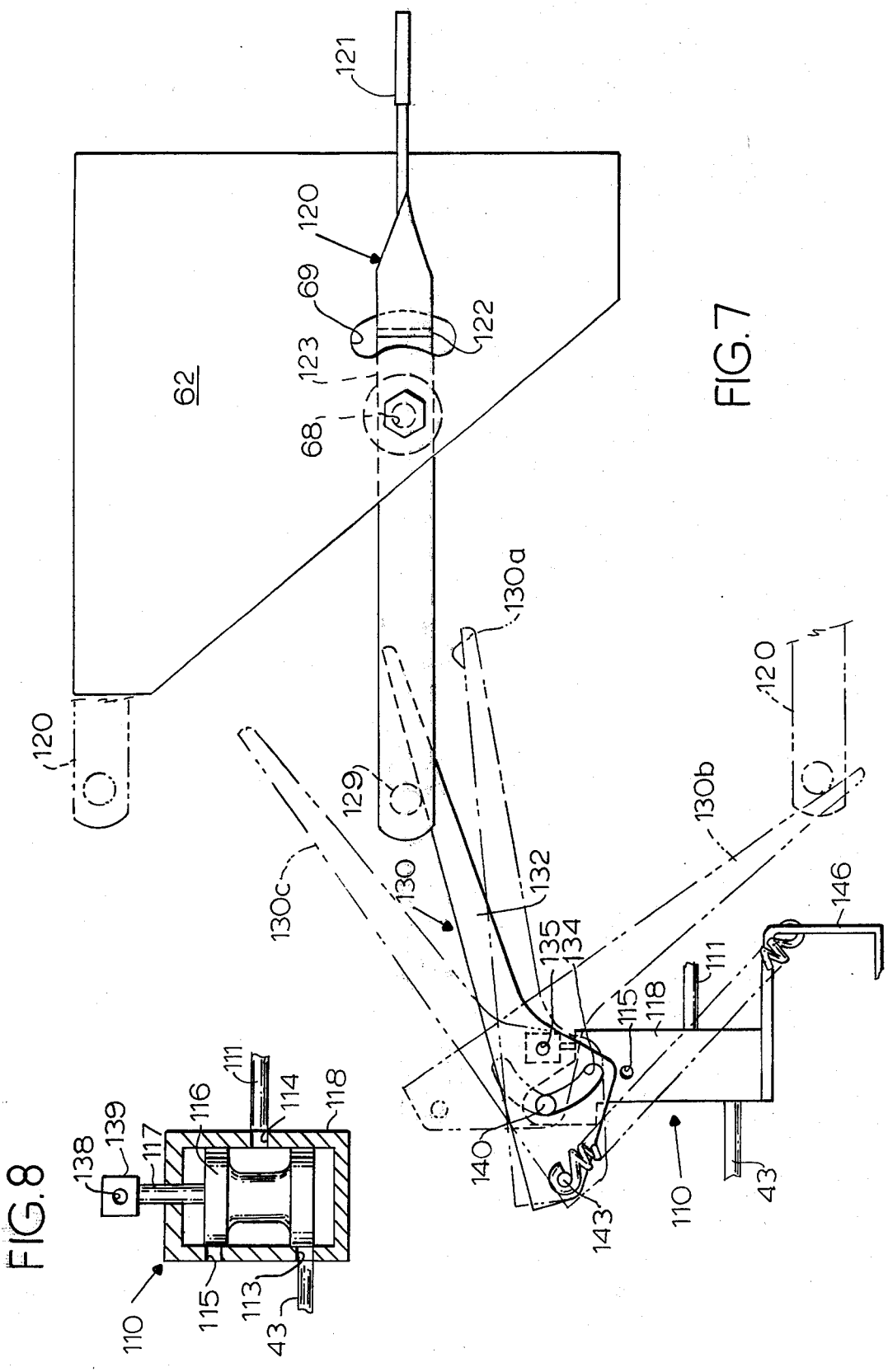

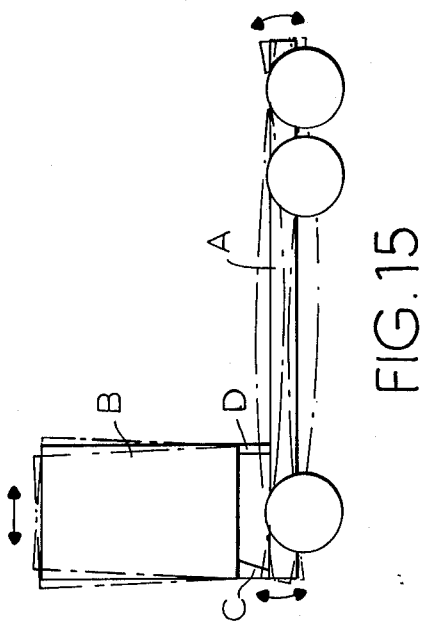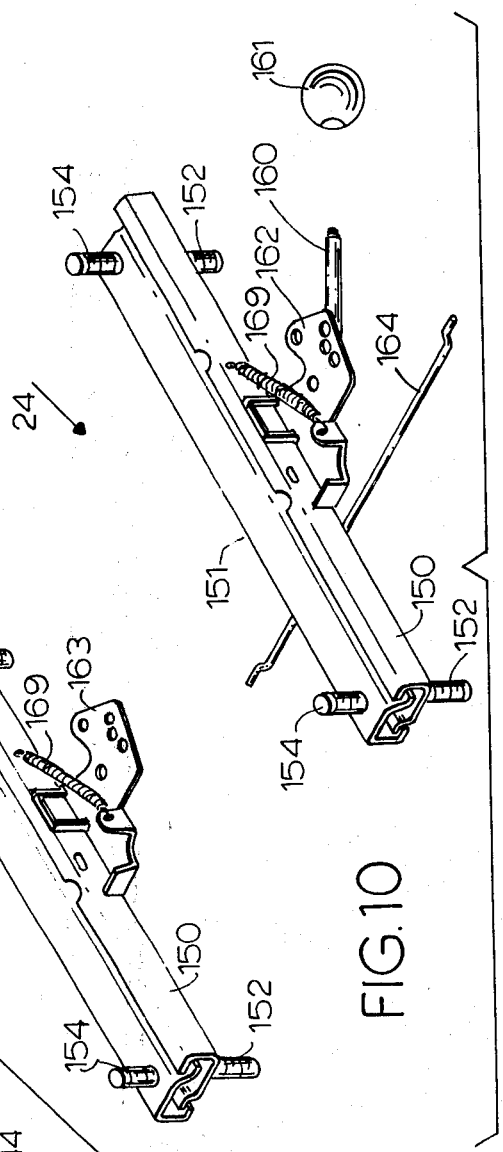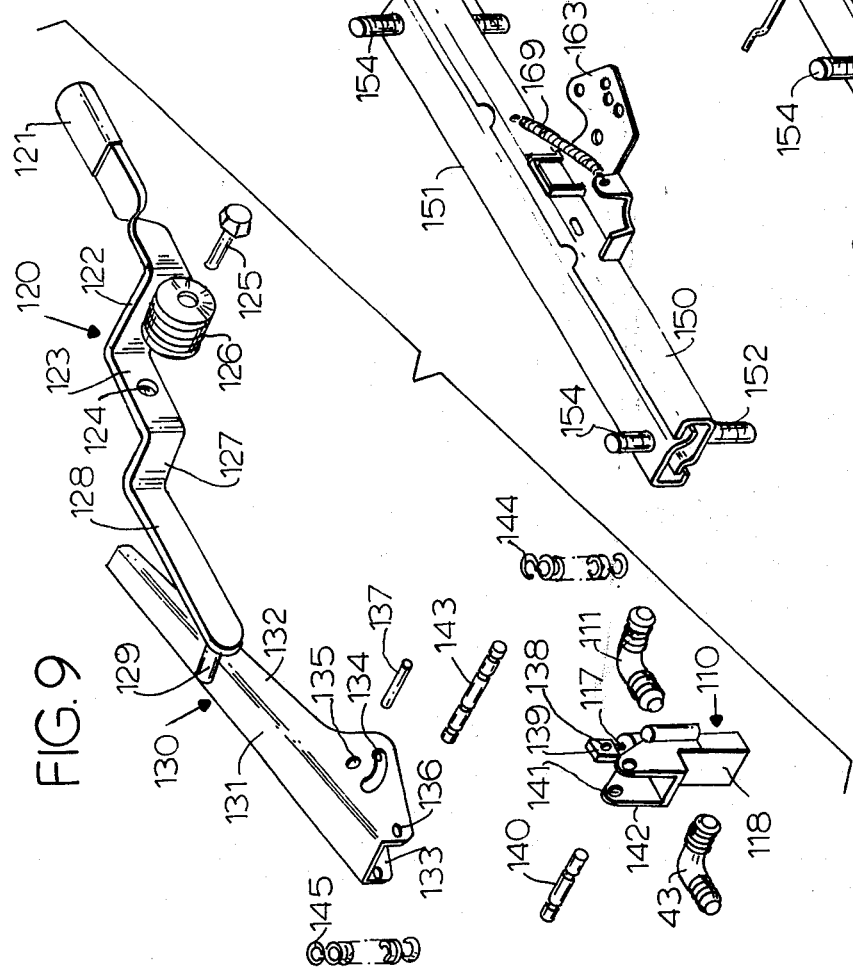

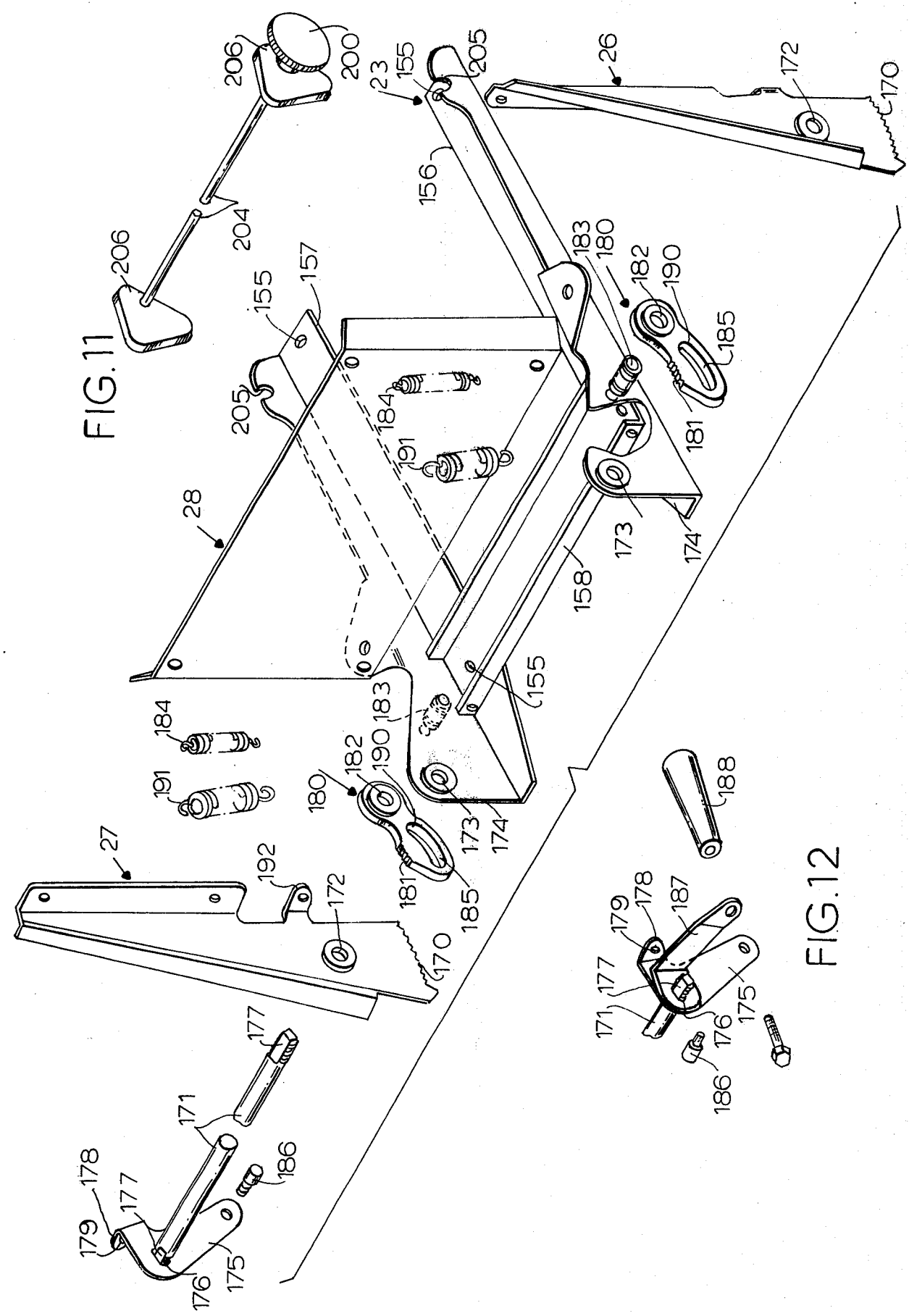

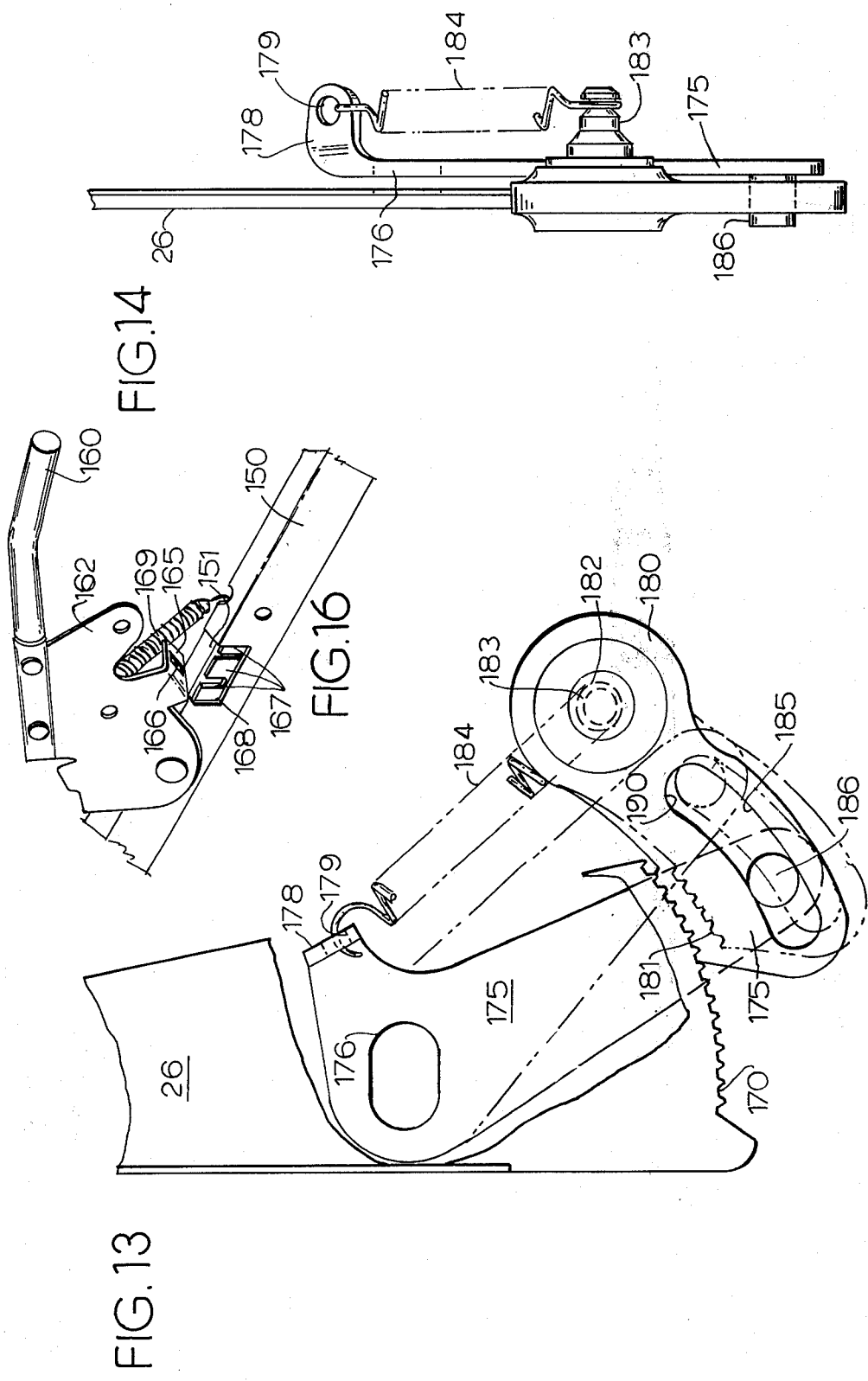

VEHICLE SEAT

BACKGROUND OF THE INVENTION

This invention relates to an improved seating assembly for use in vehicles such as trucks and buses.

The drivers of heavy vehicles who spend many hours in them need seating that is both comfortable and is an aid to safety. They need seating that can be adjusted to their own size and preferences and is adequately cushioned. Accordingly, many seating arrangements have been designed which enable fore-and-aft adjustability, which provide a suitable cushioning action to the seat, and which provide for adjustment of the back.

The present invention is an advance on these earlier inventions and relates particularly to a seat which is supported upon an air spring and in which compressed air is used to adjust the seat height.

It is very important that the adjustment of the seat height be coupled with an arrangement for maintaining the seat at the height to which it is set, even when the driver gets out of his seat or when he sits down rather heavily in it. Some seats are so made that when the driver begins to get out of the seat, the cushioning air forces the seat upwardly, making it difficult for the driver to get out and even more difficult for him to get back in. The present invention is directed to solution of this problem.

Another problem encountered with seats of this type and relatively unsolved, for little attention has been given to this problem, is that of response of the seat to pitch.

In a passenger automobile, the passengers are ideally located for riding comfort: low in the chassis and nearly midway between the axles. Vertical displacements of the wheels, due to bumps, tend to induce vertical displacements of the passengers, and no pitch component is introduced. In a large truck, however, and especially in a cab-over-engine type of vehicle, the occupant is located high above the axles in a cab that is supported on a rather narrow footing. As a result of this top-heavy arrangement, vertical displacements of the axles tend to induce horizontal displacements of the cab. In addition, the long frame rails of a truck deflect considerably under load. This up-and-down flexing of the frame rails provides one of the main vibratory inputs into the cab. As the rails flex, the front and rear of the cab move up and down unequally. Since the driver is situated above the cab mounts, he senses a fore-aft vibration.

The end result of all this is that the driver experiences a persistent "backslap" from the seat. This can be particularly bad even on apparently smooth roads such as freeways. The even spacing of dividers between concrete slabs will often cause this kind of vibratory response in a vehicle, because a resonance is created.

The present invention provides for the seat to move somewhat under either forward or backward pitch in order to stay with the driver better about a position to which the driver has set his normal position. However, as one leaves this centerpoint in either direction the movement of the seat is opposed more and more, so that there is a gradual but thorough snubbing of the pitch within a desired distance. This is an important feature in both driver comfort and safety.

The invention also provides for shock absorption and for the usual fore-and-aft adjustment of the seat.

One other problem to which the invention relates is that of providing rapid adjustment of the inclination of the seat back without requiring a more expensive type of seat back. This problem may be explained by noting that the back of the seat may be supported by rather lightweight sheet metal which is incapable of transmitting major forces. The inclination of the back should, however, be adjustable at one location, on either side of the seat, without having to adjust the two sides of the back separately, which would be extremely undesirable. The invention provides for this and does it with a novel structure having several advantages, which will be explained in the text.

SUMMARY OF THE INVENTION

The invention provides a vehicle seat for use in trucks, buses and other similar vehicles, which affords proper reaction to pitch, provides for improved adjustment of the air spring and improved retention of the seat to any position to which it is set whether the vehicle seat is occupied or not, and it also provides for improved adjustment of the seat back.

A base assembly is adapted to be secured to the floor of the vehicle. This base assembly includes a base plate and also a vertical rear standard having a pair of side walls that support a rear upper horizontal shaft and a rear lower horizontal shaft thereacross. The seat proper rests on a seat assembly which is spaced from the base assembly and includes a seat frame having a channel-shaped forward member with a front wall and two rearwardly-extending sidewalls. The front wall has a central opening, and its sidewalls support a forward upper horizontal shaft and a forward lower horizontal shaft between them. The air spring rests on the base plate and is secured to the seat frame, so that in effect the seat assembly is supported by the air spring.

A lower pivoting assembly is pivoted at its rear end to the rear lower shaft and at its forward end to the lower forward shaft. An upper pivoting assembly is pivoted at its rear end to the rear upper shaft. A lever assembly comprising a pair of lever arms pivoted at their upper ends to the forward upper shaft pivotally carries the forward end of the upper pivoting assembly. The pivot point of the upper pivoting assembly is located below that of the lever assembly itself. On the opposite side from the lever assembly, that is, below the upper pivoting assembly, is a plate that joins the two lever arms together and is generally parallel to the front wall, though not strictly so, and this plate has a central opening through it that is aligned with a central opening of the front wall.

A spring-mounting shaft has an adjustment handle at its forward end, and it extends rearwardly through the central opening of the front wall and then through and beyond the central opening of the plate, the plate being spaced rearwardly from the front wall. To the rear end of this spring-mounting shaft a bearing washer is adjustably threaded and the bearing washer is secured against rotation, so that when the shaft is rotated by the adjustment handle, the position of the bearing washer on the shaft is changed. The resistance to pitch is provided by a pair of frustoconical springs positioned around the spring-mounting shaft. The forward spring is located between and bears on both the front wall and the plate, while a rear spring is located between and bears on both the plate and the bearing washer. Thus, action in either direction is spring-loaded and is spring-loaded by a frustoconical spring, so that it becomes progressively greater as the extremities of motion are approached.

The air spring is controlled by a pneumatic system having a valve which operates both to admit additional air from the compressor to the air spring and, at other times, to bleed the air spring of some of the air already in it. This valve is provided with a plunger which controls the admission of air and the bleeding of the air.

A control arm is mounted pivotally to a pin on the upper end of the plunger and is also provided with an arcuate slot through which extends a shaft that is mounted to the body of the valve. The control arm is also attached to the upper end of springs whose lower end is attached to the base assembly. The control arm extends forwardly of the pivot points, and its upper surface engages a pin located on a seat adjustment handle. This handle is pivoted to the seat assembly frame in such a way that it is automatically locked in position once it is set manually to any desired position by the truck operator.

When the truck operator gets in a seat and wants to adjust it, he moves the control handle either up or down, thereby lowering or raising the control arm, to cause actuation of the plunger either to send more air in or to bleed some air from the air spring. Once he has done this, the seat is set in a position that is to be retained. Motion upward of the seat when he removes his weight from it is counteracted by the control arm following the lever arm upwardly with the seat assembly, pivoting about the shaft mounted on the valve body, and thereby actuating the plunger to bleed air from the air valve, while motion downwardly when the man gets into the empty seat again is followed by actuation of the plunger that moves the plunger to its position of admitting air to the air spring. The action is practically instantaneous so that there is generally only a light motion. However, if the motion does continue beyond the position in which the valve plunger has moved to its extreme position, then the springs attached to the lever take over, and the lever itself is caused to pivot about the pin on the upper end of the plunger. The arcuate slot is of sufficient length such that the seat will bottom before the shaft which extends through the slot comes up against the end of the slot.

On the seat assembly is provided a fore-and-aft adjustment enabling the truck driver to set his normal position and to that the actual seat frame proper is secured and to that frame the back is pivotably mounted.

At each side of the seat back a supporting member provides a gear sector which can be interlocked with a gear sector mounted on the seat frame or on stub shafts attached thereto. A central shaft goes through the supporting members and connects a pair of lockup fingers; an adjustment handle is provided enabling disengagement by the lockup fingers of the gear sectors mounted on the seat frame from those on the seat back supporting members, so that the seat back can be moved to any position and then reengaged by operation of this manual handle. The central shaft extending through the two back supporting members together is a key feature which enables a rapid adjustment without acting through the back of the seat itself.

BRIEF DESCRIPTION OF THE DRAWINGS

In the drawings:

FIG. 7 is a view in side elevation of a sub-assembly controlling the seat height adjustment. Various positions of key parts are shown in broken lines.

FIG. 8 is a view in section of a control valve in the sub-assembly of FIG. 7.

FIG. 9 is an exploded isometric view of the sub-assembly of FIG. 7.

FIG. 10 is a partially exploded isometric view of the fore-and-aft-adjustment sub-assembly of the seat assembly of FIGS. 1 and 2.

FIG. 11 is an exploded isometric view of the seat frame and back frame members and the gear sectors, etc., enabling the inclination of the back.

FIG. 12 is an exploded isometric view of the adjustment control mechanism for the sub-assembly of FIG. 11.

FIG. 13 is an enlarged fragmentary view in side elevation of one of the back-inclination-adjustment sub-assemblies of FIG. 11. The sub-assembly is shown engaged in solid lines and disengaged in broken lines.

FIG. 14 is an enlarged fragmentary view in front elevation of the sub-assembly of FIG. 13.

FIG. 15 is a diagrammatic view in side elevation illustrating how cab pitch is induced by frame flexure in response to road roughness.

FIG. 16 is a bottom view of the fore-and-aft slide adjustment mechanism of FIG. 10.

DESCRIPTION OF A PREFERRED EMBODIMENT

Figure 2:
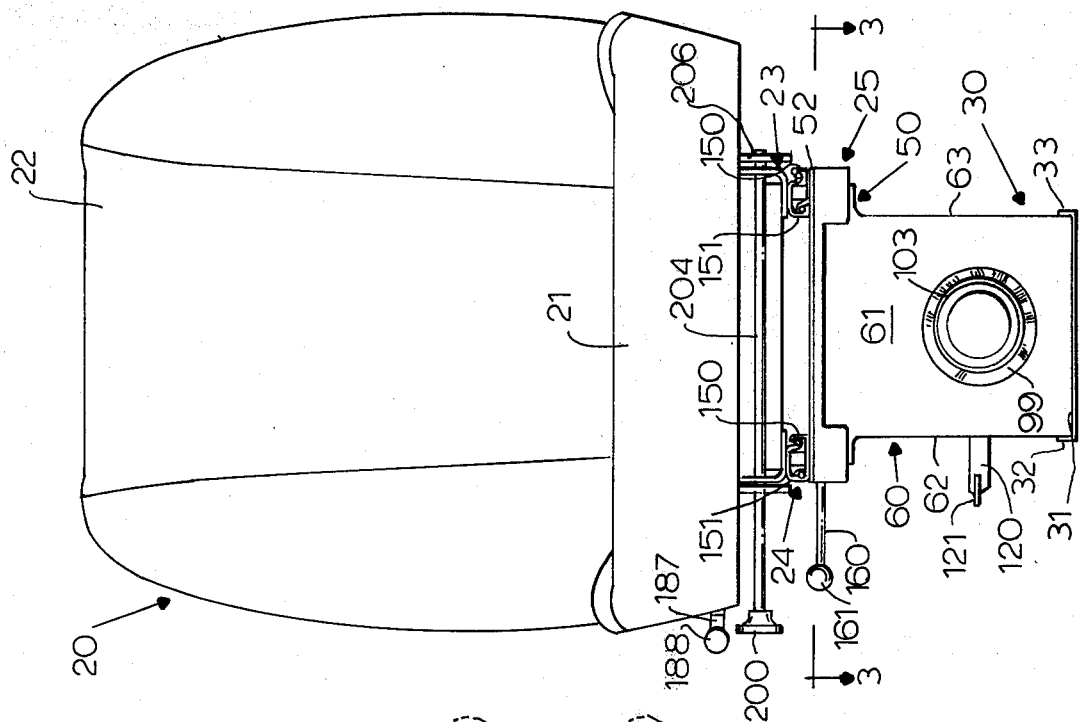
FIG. 2 is a view in front elevation of the seat assembly of FIG. 1.
Figure 1:
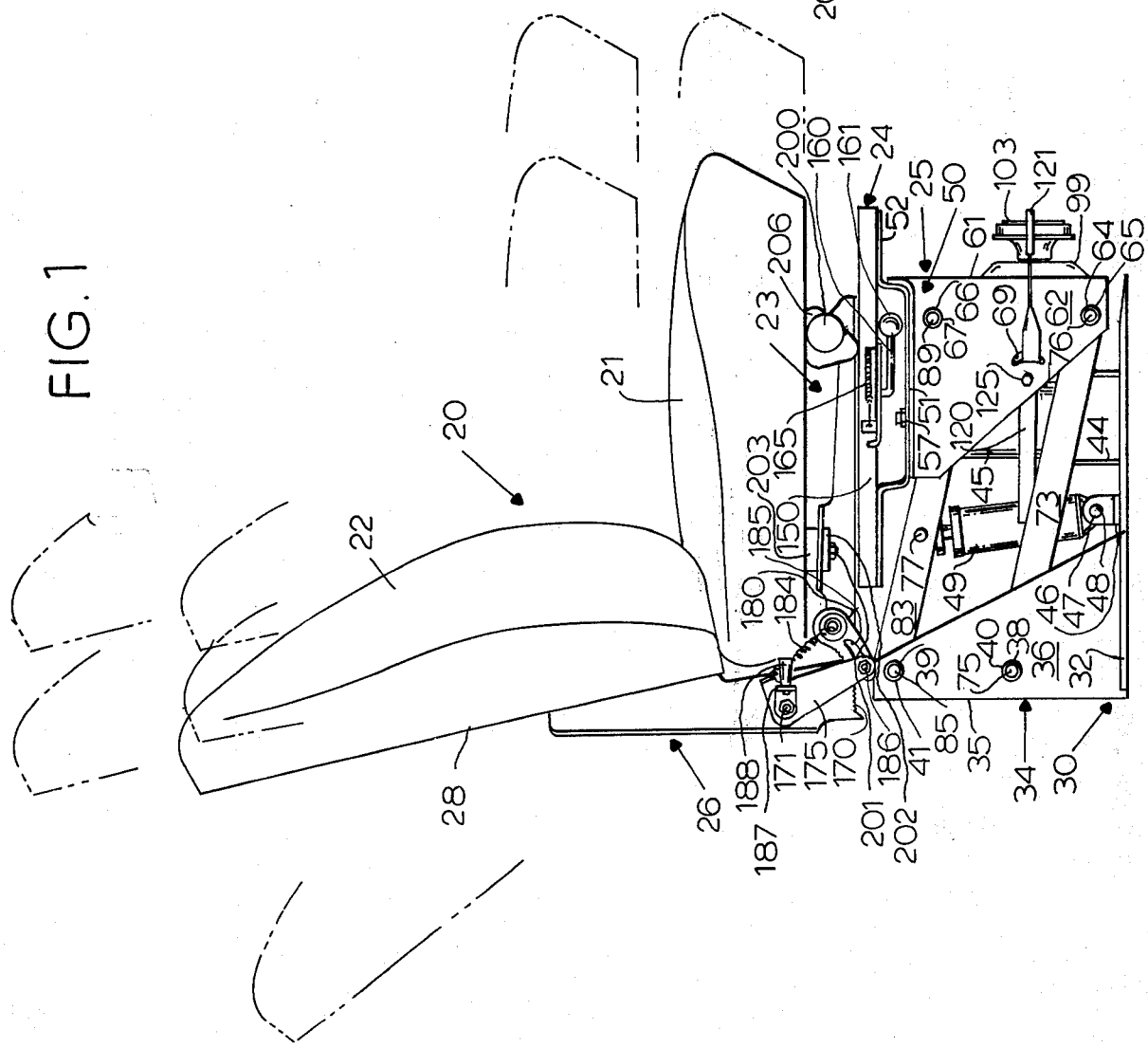
FIG. 1 is a view in side elevation of a vehicle seat assembly embodying the principles of the invention. Various positions of the seat and back are shown in broken lines.
Figure 3:
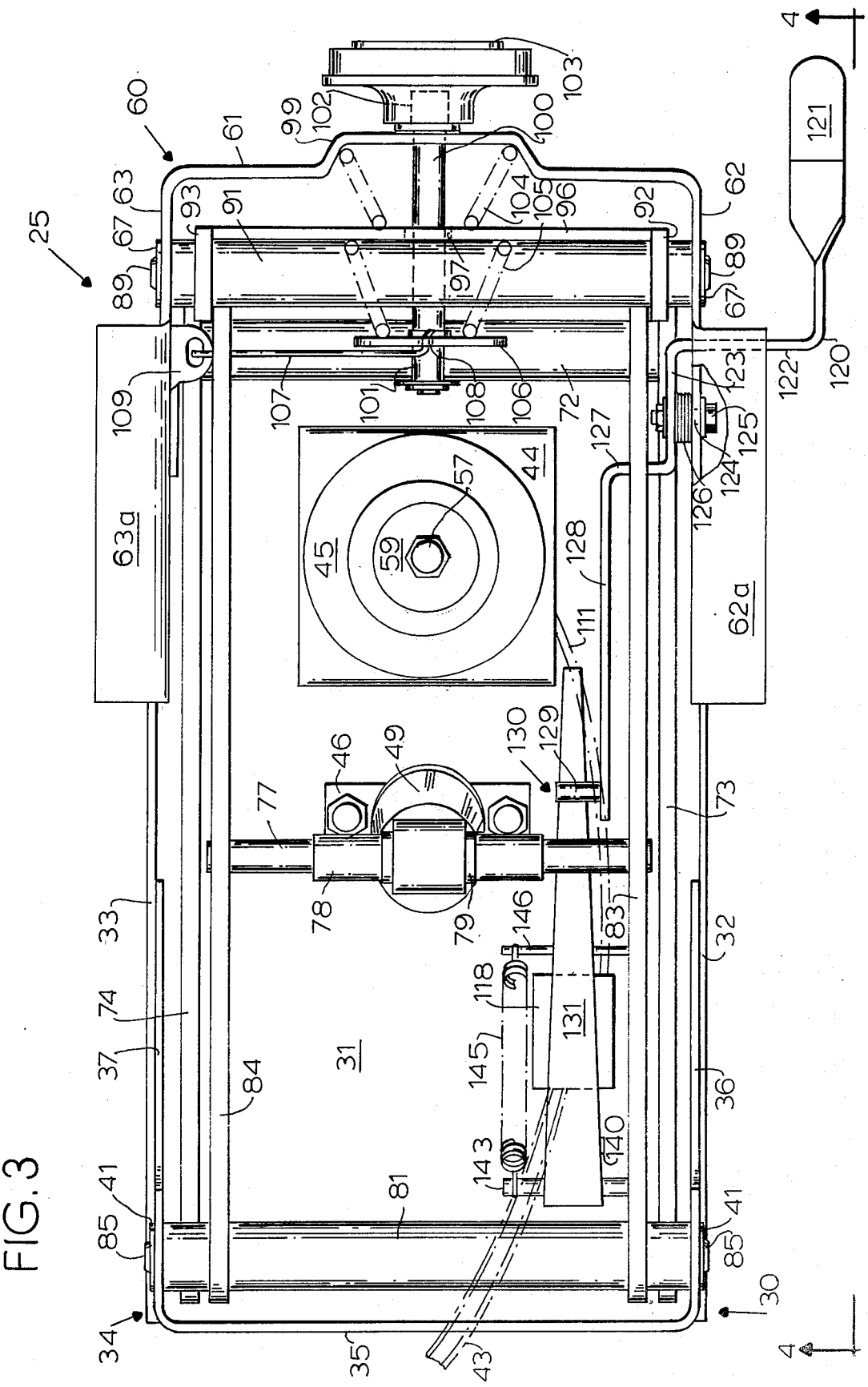
FIG. 3 is a view in horizontal section taken along the line 3—3 in FIG. 2.

FIGS. 1 and 2 show a vehicle seat assembly 20 embodying the invention, comprising a seat 21 and a back 22. The cushioned seat 21 is mounted on a seat frame 23 (See FIG. 11), which is supported by a fore-and-aft-adjustment sub-assembly 24 (See FIG. 10). The sub-assembly 24 itself rests on a lower seat assembly 25, which comprises a number of elements and sub-assemblies and which is shown as a whole in FIGS. 3 and 4. The seat back 22 is supported by a pair of upstanding frame members 26 and 27 and a back pan 28, all shown in FIG. 11.

The lower seat assembly 25 (FIGS. 1–4)

The lower seat assembly 25 (FIGS. 1–4)

The lower seat assembly includes a base assembly 30 and an upper frame assembly 50 which are connected to each other, not only through an air spring 45 and a shock absorber 49 but also through a pitch-isolating system which includes three pivoting assemblies 70, 80, and 90. The lower seat assembly 25 also includes a valve 110 and a lever 120 for adjusting the seat height through the pressure in the air spring 45 and mechanism for controlling the valve 110 to maintain the desired seat adjustment when the driver gets into and out from the seat 21.

The base assembly 30 and related parts (FIGS. 1–5)

The base assembly 30 is secured firmly and immovably to the floor of the truck cab, which is not shown here. The base assembly 30 includes a base plate 31 with upstanding side edges 32 and 33 and a generally channel-shaped, vertical rear standard 34 rigidly secured to the rear of the plate 31. The rear standard 34 has a vertical rear wall 35 and two parallel trapezoidal side walls 36 and 37. These side walls 36 and 37 are each provided with two openings 38 and 39 in which are secured a lower annular bearing 40 and an upper annular bearing 41. The rear wall 35 may contain suitable openings 42 to receive compressed air conduits 43 from the truck's air compressor (not shown). The base plate 31 may fixedly support an air spring pedestal 44 to which is secured the lower end of an air spring 45. The base plate 31 may also support a bracket 46 with openings 47 to receive a pivoting shaft 48 for a shock absorber 49.

The upper frame assembly 50 (FIGS. 1, 2, 4, and 6)

The upper frame assembly 50 has an upper pan 51 provided with a horizontal forward portion 52, a rear horizontal portion 54 at the same level as the portion 52, and a somewhat lower intermediate horizontal portion 53 joined to the portions 52 and 54 by vertical portions 55 and 56. The intermediate portion 53 is secured, as by a bolt 57 extending through an opening 58 to the upper end 59 of the air spring 45. Secured to the upper pan 51 and extending down from it is a generally channel-shaped frame member 60 having a forward wall 61 and two parallel, trapezoidal sidewalls 62 and 63. The sidewalls 62 and 63 are bent over at 62a and 63a at their upper ends for attachment, as by welding, to the pan 51. The sidewalls 62 and 63 each have openings 64 seating lower bearings 65 and openings 66 seating upper bearings 67. The sidewall 62 also has an opening 68 used in mounting the height-adjusting lever 120 (described below) and an arcuate slot 69 through which the lever 120 extends.

Figure 4:
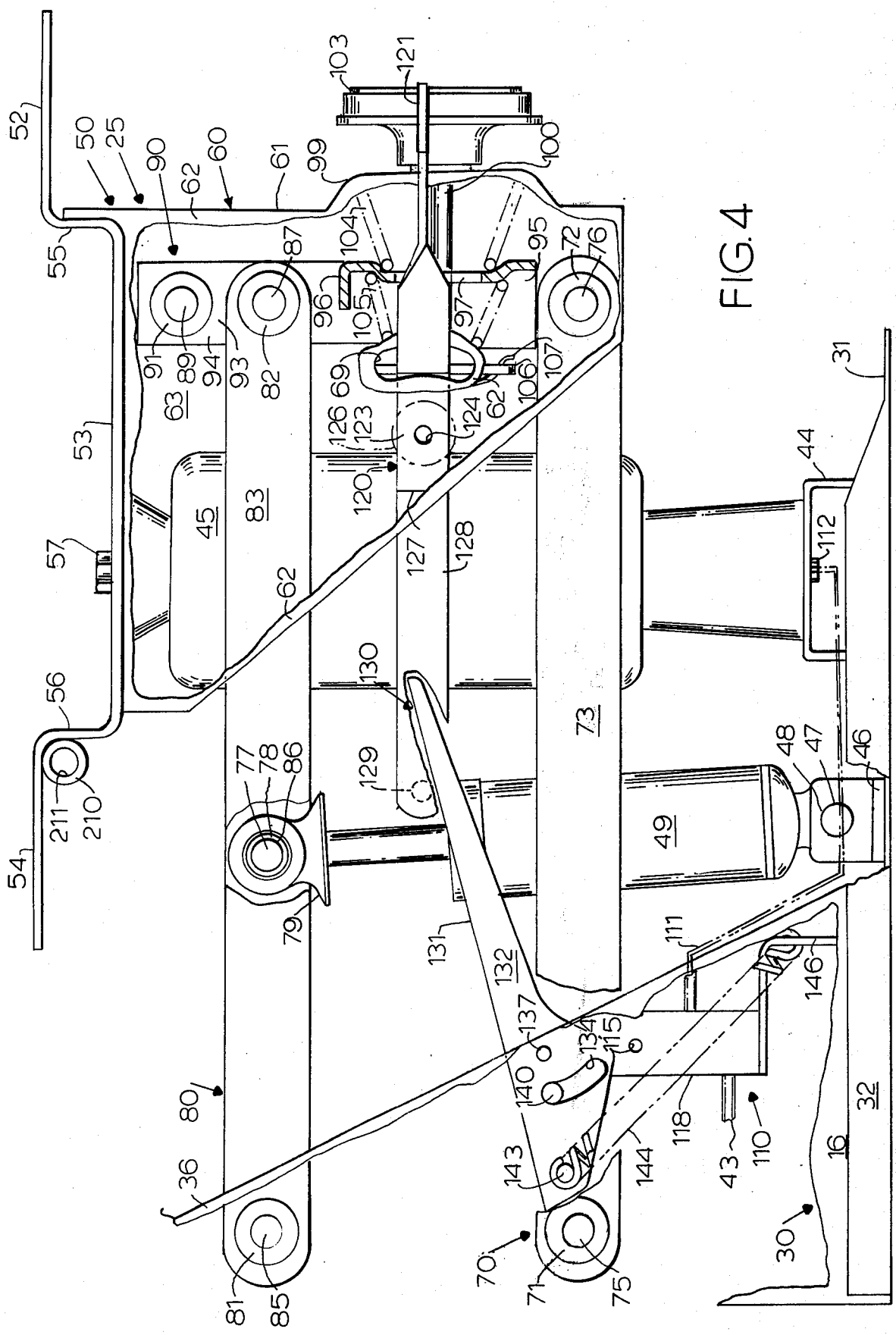
FIG. 4 is a view in side elevation viewed along the line 4—4 in FIG. 3 but with portions broken away and shown in section.
Figure 5:
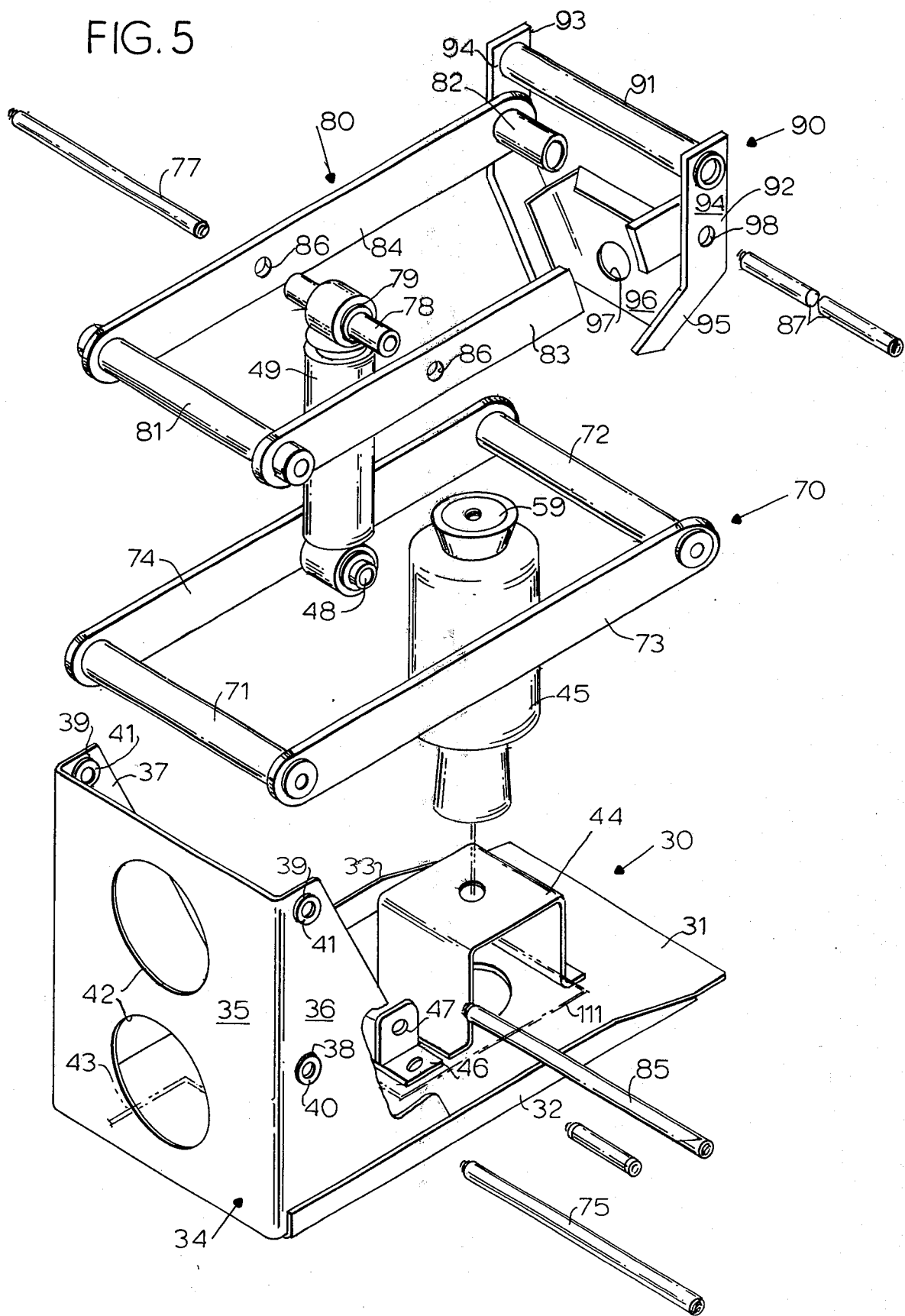
FIG. 5 is a partially exploded isometric view of the base assembly, the upper and lower link assemblies and the lever assembly, together with some related parts, all for the lower part of the seat assembly of FIGS. 1–4.
Figure 6:
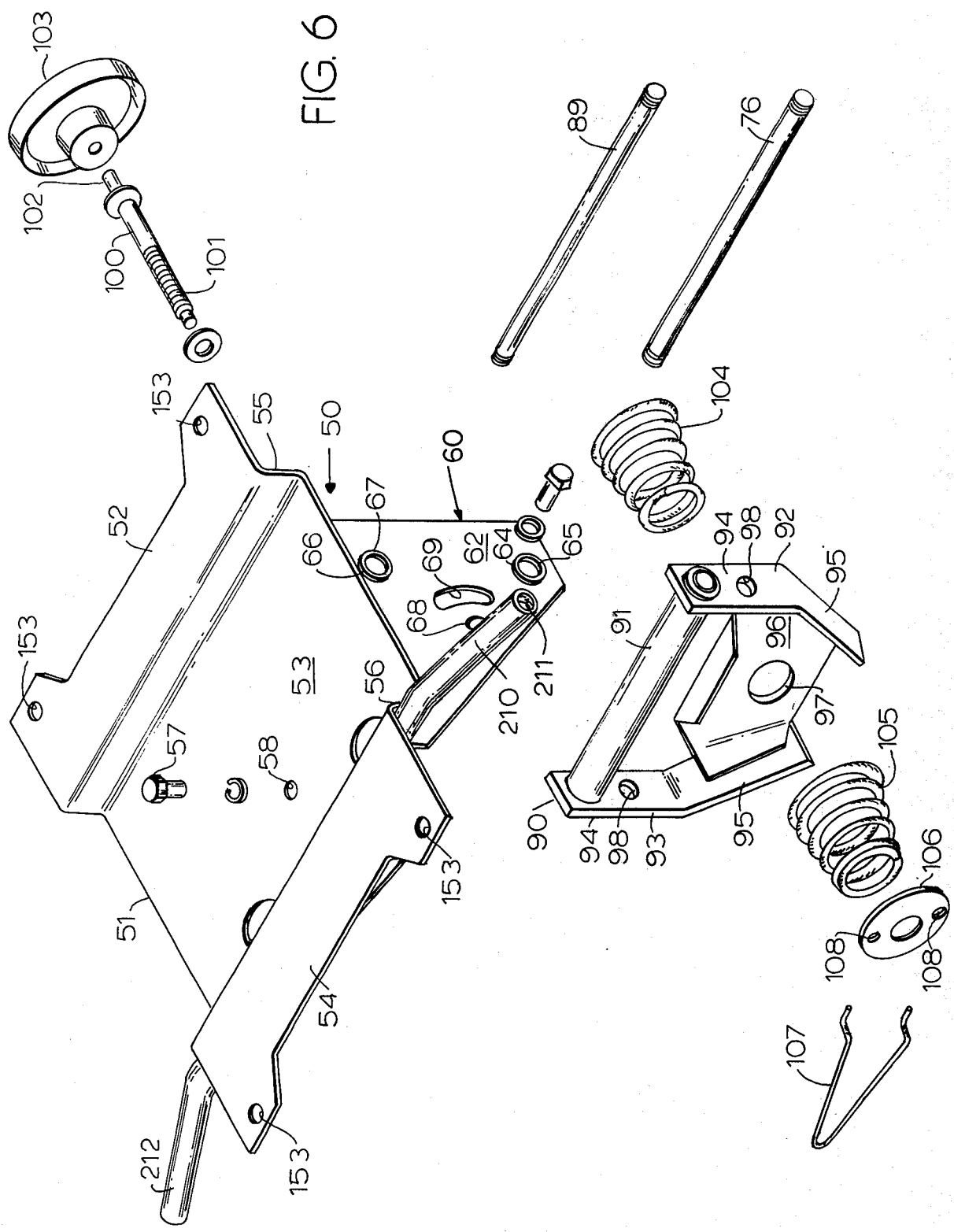
FIG. 6 is an exploded isometric view of the lever assembly and seat support assembly and the pitch-responsive springs of the seat assembly of FIGS. 1–4.

The pitch isolation system (FIGS. 1–6 and 15, especially FIGS. 5 and 6)

FIG. 15 shows how pitch is generated. In response to road roughness, a truck frame A flexes up and down, due to suspension inputs to the frame A. The truck has a cab B with front and rear mounts C and D that then tend to vibrate up and down out of phase. As a result the cab B tends to oscillate in what may be called a pitch mode.

The system which supplies pitch isolation to the lower seat assembly 25 and which comprises the pitch-resisting means, includes three pivoting assemblies 70, 80, and 90, and the adjustable spring connection between the frame member 60 and the assembly 90 set forth below.

A lower rectangular pivoting assembly 70 comprises two hollow shafts 71 and 72, one at each end, joined by a pair of rigid bar links 73 and 74. The rear shaft 71 is pivotally supported around a solid shaft 75, which is itself supported by the lower bearings 40 of the sidewalls 36 and 37. The forward shaft 72 is pivotally supported around a solid shaft 76, which is itself supported by the lower bearings 64 of the sidewalls 62 and 63. The shafts 75 and 76 may be secured in place by lock rings or other suitable means. The shafts 75 and 76 remain stationary relative to the rear standard 34 and the frame member 60, respectively, and the respective hollow shafts 71 and 72 rotate pivotally around them.

The upper rectangular pivoting assembly 80 comprises a hollow rear pivot shaft 81, a hollow front pivot shaft 82, and a pair of forwardly extending bar links 83 and 84. The shaft 81 pivots around a solid shaft 85, which is supported by the upper bearings 41 of the sidewalls 36 and 37. Openings 86 in the links 83 and 84 receive a solid shaft 77 about which pivots a hollow shaft 78 of the upper end 79 of the shock absorber 49. The hollow front shaft 82 rotates around a solid shaft 87, but the shaft 87 is not supported by the walls 62 and 63 but instead is supported by a pitch-transmitting and snubbing assembly 90.

The assembly 90, which may be called a lever assembly, comprises a hollow shaft 91 joining a pair of bars 92 and 93. The shaft 91 pivots around a solid shaft 89 that is supported by the upper bearings 67 in the sidewalls 62 and 63 of the upper frame assembly 50. Each bar 92, 93 has an upper vertical portion 94 and a lower downwardly and inwardly extending portion 95. The portions 95 are joined together by a plate member 96 having a central opening 97. The upper portions 94 include bearing openings 98 into which fit the ends of the shaft 87 that pivotally supports the hollow shaft 82 of the assembly 80.

The forward wall 61 of the frame member 60 is provided with a boss 99 having a central opening through which extends an adjusting shaft 100 having a threaded inner or rear end 101 and a keyed forward end 102, to which is attached a handle 103, lying forward of the boss 99. The shaft 100 also extends through the opening 97 in the lever assembly 90, and a frustoconical spring 104 is positioned between and bears on the plate 96 and the forward wall 61. A second frustoconical spring 105 bears against the opposite side of the plate 96, while its smaller end bears against a bearing washer 106, which is threaded to the threaded end 101 of the shaft 100. An antirotation wire 107 extends from two openings 108 in the washer 106 to a bracket 109 secured to the wall 63, to hold the washer 106 against rotation and thereby enable adjustment of the pressure of both springs 104 and 105 on the plates 96 and washer 106 and on the wall 61 by rotation of the handle 103. This preloading adjustment is quite important since individuals vary widely as to how much firmness in response they want.

Operation of the pitch isolation system

The elements so far described serve to isolate to some extent the pitch of the seat 20 and also to limit the amount of pitch. The conical springs 104 and 105 assure the greatest freedom of horizontal movement (i.e., pitch) at the locations closest to the center position of the seat 20 and the greatest resistance to pitch at the two extreme ends of the pitch movement.

Thus, the upper frame assembly 50 is pivotally mounted with respect to the forward shaft 72 of the lower rectangular assembly 70 and also is pivotally mounted with respect to the shaft 91 of the lever assembly 90. As a result, pitch tends to cause the upper seat assembly 50 to rotate relatively to the shaft 72, while the links 83 and 84 of the upper assembly 80 resist this rotation of the assembly 50, the forward shaft 82 pivoting relatively to the lever assembly 90. This causes rotation of the lever assembly 90 about the shaft 89, thereby resulting in compression of one of the two springs 104 or 105 and a restoring moment about the shaft 91. The handle 103 enables adjustment of the springs 104 and 105 to provide any desired degree of softness or firmness in the response to pitch, and the driver can select what he wants.

Height adjustment (FIGS. 1–4 and 7–9)

Another important function of the seat-supporting structure is to enable height adjustment and to retain that adjustment once it is set, so that the seat 21 does not change height when the driver gets in or out of the seat 21.

A valve 110 (See FIGS. 7–9) is connected by the air conduit 43 to the vehicle's compressor (not shown) and is connected by a conduit 111 to the air spring 45 at a suitable fitting 112. The valve 110 makes it possible to add further air to the air spring 45 to raise the height of the seat assembly 20 or to bleed air from the air spring 45 to lower the height of the seat assembly 20. A novel structure holds the air system sealed for small excursions and adds or bleeds out air for larger excursions. The large excursions, however, do not need to change the preset adjustments, so that a large over-travel can be accommodated. The same structure has, as perhaps its most important function, that of preventing the seat 21 from following the driver up during exit but instead causing it to remain during the no-load conditions at the height to which the driver has set it. Furthermore, it is important that there be no moving air lines, so that all the valving can remain stationary, since air lines, that move tend to get pinched.

The valve 110 (See FIG. 8) has an inlet 113 connected to the conduit 43, an outlet 114 connected to the conduit 111, and a bleed opening 115. A spool assembly 116 is mounted on a plunger 117, and the valve's housing 118 is so oriented that when the plunger 117 is moved downwardly, compressed air from the conduit 43 is supplied to the air spring 45 via the conduit 111; and when the plunger 117 is moved upwardly, air is bled from the air spring 45 via the conduit 111 and the bleed opening 115.

A height-adjusting lever 120 has a handle 121 conveniently located for the driver to operate the device while he is in the seat 21. From the handle 121, a transverse portion 122 of the lever 120 passes through the slot 69 of the wall 62 and leads to a fore-and-aft extending portion 123 having an opening 124. A bolt-like stub shaft 125 extends through this opening 124 and through the opening 68 and is used to mount the lever 120 pivotally to the wall 62. The slot 69 in the plate 62 serves to limit the amount of travel of the lever 120. A friction detent is provided to hold the lever 120, in a position to which it is set, as by a stack of Belleville washers 126 surrounding the stub shaft 125 and bearing against the wall 62 and against the lever portion 123.

The lever 120 also has a second transverse portion 127 leading to a long fore-and-aft portion 128 that terminates in a lever pin 129. The lever pin 129 rides slidably atop a channel-shaped control arm 130, which is spring-mounted so that its upper wall 131 follows the lever pin 129 upwardly and also yields so that the control arm 130 can be forced downwardly by the lever pin 129. The control arm 130 is provided with side walls 132 and 133 each of which has an arcuate slot 134 and two pivot openings 135 and 136.

A pin 137 extends across through the two openings 135 and also extends through an opening 138 in the head 139 of the plunger 117 for the valve 110. Another pin 140 extends through openings 141 in a clevised end 142 of the body 118 of the valve 110 and extends out through the two slots 134. A third pin 143 extends through the openings 136 of the control arm 130 and is hooked to one end of each of a pair of springs 144 and 145, the other end of each spring 144 and 145 being anchored to a bracket 146 on the base plate 31. The valve body 118 is anchored to the base assembly 30, as to the bracket 146.

Operation of the height adjusting and maintaining sub-assembly

The control arm 130 (as shown in FIG. 7) pivots clockwise (downwardly) when the handle 121 is manually lifted, so that the lever 120 is moved counterclockwise, the springs 144 and 145 resisting this movement and being ready to restore the control arm 130 toward its original position when the lever handle 121 is released. Similarly, the springs 144 and 145 cause the control arm 130 to swing counterclockwise (upwardly) when the lever 120 is manually moved clockwise as the lever handle 121 is depressed. These movements enable manual adjustment of the seat height, as will be seen.

Since the lever 120 is secured by the stub shaft 125 to the wall 62 of the upper frame assembly 50, the lever 120 also moves up and down with the seat 21. Downward movement of the seat 21 and the lever 120 depresses the control arm 130 (clockwise movement); upward movement of the seat 21 and the lever 120 enables the control arm 130 to rise (counterclockwise movement).

The control arm 130, when swung, pivots first about the pin 140 and raises or depresses the plunger 117; when the plunger 117 reaches an extreme downward position, the control arm 130 then pivots about the pin 137.

With the control arm 130 in its equilibrium position and the lever arm 120 not being disturbed manually, substantial downward movement of the upper frame assembly 50 carries the whole lever arm 120 down and causes the pin 129 to depress the control arm 130. The springs 144 and 145 then exert sufficient force to cause the control arm 130 to pivot about the pin 140 and also to depress the plunger 117. As the plunger 117 is depressed, the valve 110 supplies air to the air spring 45 via the conduit 111. Further downward motion of the seat assembly 50 causes the plunger 117 to bottom, with the control arm 130 at the position 130a, shown in broken lines in FIG. 7. Once the plunger 117 has bottomed, further rotation of the control arm 130 takes place about the pin 137, and the control arm 130 is then lifted off from the pin 140. The maximum downward travel of the control arm 130 is indicated by a position 130b, shown in broken lines in FIG. 7.

The air being supplied to the air spring 45 causes the seat assembly 20 and therefore the lever 120 to return to its initial equilibrium position. If the seat assembly 20 should attempt to rise further, the springs 144 and 145 rotate the control arm 130 about the pivot pin 140, lifting the plunger 117 and keeping the control arm 130 in contact with the pin 129 on the lever 120, thereby bleeding air from the air spring 45. Position 130c corresponds to the end of the plunger travel. If there is further upward travel, the pin 129 is lifted off the control arm 130. When sufficient air has been bled from the air spring 45, the seat assembly 20 again returns to its equilibrium position.

When it is desired to adjust the seat height, the driver either depresses or raises the handle 121, and the seat assembly 20 moves to its desired level. The handle 121 remains in any position to which it is set, by virtue of the washers 126. The operation is substantially the same as that which has been described already in regard to the admission or release of air.

The fore-and-aft adjustment assembly 24 (FIGS. 1, 2, 10, and 16)

To the upper pan 51 are secured two lower channel guide members 150, one on each side. An upper channel guide member 151 is interlocked with the lower channel guide member 150 and enables fore-and-aft movement. Thus, screws or studs 152 may secure the lower member 150 to the pan 51, extending through the openings 153, while upwardly extending studs or bolts 154 may secure the upper channel guide members 151 to the upper seat frame 23, extending through the openings 155 in side frame members 156 and 157 of the frame 23 and also, at the rear through a channeled cross frame member 158.

A lever arm 160 having a handle 161 is attached to a crank 162, which is connected to an identical crank 163 by a connecting rod 164. The cranks 162 and 163 are pivotally attached to the bottoms of the lower channels 150 and carry a pawl 165 having an opening 166 which normally engages some detents 167 in a rack 168 secured to the upper channels 151, so that the handle 161 can be swung to release the pawl 165 from the rack 168. Then the upper channels 151 can move fore and aft relative to the lower channels 150. Rollers and bearings in the channels reduce the friction of such relative movement. The driver can thus move the seat 21 fore and aft relative to the lower seat assembly 25. Springs 169, secured between the cranks 162, 163 and the respective lower channels 150, act to urge the pawls 165 to their locked position when the handle 161 is released, thereby engaging the rack 168 and holding the seat frame 23 in the position to which it has been adjusted.

Seat back inclination (FIGS. 1, 2, and 11-14)

Adjustment of the reclining back 22 is rapid, and the locking in place is automatic and sure.

The back 22 is supported by the two frame members 26 and 27 and by a light sheet-metal pan 28. It is impractical to rely upon the pan 28 to hold the back 22 rigid, and prior art devices, in requiring a torsionally rigid seat back frame have required a heavy, thick frame. In today's trucks, where space is at a premium, a thin back is needed, and bulky supports are out of the question.

In order to solve the problems encountered, the back frame side members 26 and 27 double as indexing sectors (See FIG. 11), each having an arcuate gear sector 170 along their lower edges, and the members 26 and 27 are both rotatably mounted on a large rigid torsion bar 171 by bearings 172. The torsion bar 171 extends through and is journaled in bearings 173 in upright flanges 174 of the seat frame side members 156 and 157.

Secured to the torsion bar 171 are a pair of lockup fingers 175 (FIG. 12) having keying openings 176 for securing them to non-round portions 177 of the torsion bar 171. Each lockup finger 175 has a flange 178 with an opening 179 therethrough.

A pair of lockup sectors 180 having an arcuate toothed edge 181 adapted for engagement with the gear sectors 170 have bearings 182 that are mounted rotatably on respective stub shafts 183 that are secured to the frame flanges 174. Return springs 184 are each secured at one end to a stub shaft 183 and at the other end to the opening 179. Each lockup sector 180 has an arcuate slot 185 which is progressively eccentric relative to the torsion bar 171 and which receives a pin 186 that is secured to the lockup finger 175. Thus, the effective ramp angle of the slot 185 varies with the position of the lockup finger 175.

On one end of the torsion bar 171, a crank 187 is secured, and a handle 188 is secured to the crank 187. By lifting on the handle 188, the driver rotates the crank 187 and therefore the torsion bar 171 and the lockup fingers 175. Rotation of the lockup fingers 175 toward an end 190 of the slot 185 nearer the stub shaft 183 causes the lockup sector 180 to be moved away from the indexing sector, disengaging the teeth 181 from the teeth 170. While the teeth are so disengaged, the driver adjusts the back 22 to the desired inclination, and then he releases the handle 188. This release enables the return spring 184 to rotate the lockup fingers 175 and torsion bar 171 and to pull the lockup sector 180 into engagement with the teeth 170. Adjustment is helped by a pair of springs 191, which are secured at one end to the cross frame member 158 and at the other end to a bracket 192 on the back frame members 26 and 27; these springs 191 preload the seat back forwardly, so that the operator does not have to pull it up from a reclined position.

Incipient lockup occurs when the lockup finger pin 186 is at a position in the slot 185 such that the effective ramp angle is so small that it would require an unattainably small coefficient of friction between the pin 186 and the slot 185 for "camout" to occur, and therefore there is no camout.

This adjustment is rapid and sure, with positive detent locking on both sides and a positive locking for both fore-and-aft back loading.

Other adjustments and features

A handle 200 (See FIGS. 1, 2, and 11) is used to adjust the angle of the seat cushion 21 relative to the floor plane. The seat cushion 21 is attached to the seat frame 23 by a pair of bolts 201 near the rear of the cushion 21, and two rubbers washers 202 and 203 at each bolt 201 isolate the cushion 21 from the frame 23 and enable the cushion 21 to pivot there slightly relative to the frame 23. Forward of this is a transverse shaft 204 that rests in slots 205 in the seat frame 23 and to which two roughly triangular cams 206 and the handle 200 are attached. Turning the handle 200 rotates the cams 206 thereby elevating the front of the cushion 21 to the operators' choice of positions.

FIGS. 4 and 6, especially, show a formed hollow tube 210 that is welded to the upper pan 51. The open ends 211 and 212 of the tube 210 are threaded to accommodate a bolt in each end. The tube 210 serves as the intermediate connecting point for the seat belt installation. All suspension seats require two sets of seat belts: one conventional set of belts to restrain the occupant in the seat, and another set of "tether belts" that run from the seat to the floor anchorages. The lap belt is adjusted snugly around the occupant, while the tether belts are left sufficiently loose to permit the seat to move up and down through its normal range of motion. The intermediate connecting point is the point where these two sets of belts are joined together. This arrangement avoids the constant loosening and tightening problem one would have if the lap belt went all the way to the floor.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A vehicle seat, including in combination:
a base assembly secured to the floor of the vehicle and having a horizontal portion and an upwardly extending supporting portion,
a seat assembly spaced from said base assembly and including a seat frame having a horizontal portion and a downwardly extending portion, a seat supported by said frame, and a rigid torsion rod extending through and journaled on said frame,
an air spring resting on said horizontal portion of said base assembly and secured to said horizontal portion of said seat assembly and supporting said seat assembly and seat,
manually operated means for adjusting the amount of air in said air spring to place seat at a desired elevation,
weight-actuated means responsive to a change in the weight bearing on said seat for changing the amount of air in said air spring by an amount sufficient to retain said air spring in the position to which it had last been set by said manually operated means,
two back frame uprights, one at each side, rotatably supported on said rod, each having a lower arcuate gear-toothed edge,
a thin sheet metal pan secured to and between said uprights,
a pair of lockup sectors pivotally mounted to said seat frame, each having an arcuate gear sector for engagement with a said gear-toothed edge,
engagement means urging each said gear sector into engagement with its associated said gear-toothed edge,
manually operated disengagement means secured to said rod for disengaging said gear sector from said gear-toothed edge to enable adjustment of the inclination of said back, and
yieldable pitch-resisting means operably interconnecting said upwardly extending portion of said base assembly with said downwardly extending portion of said seat assembly, enabling limited and dampened fore-and-aft movement of said seat assembly substantially independent of vertical movement of said seat assembly comprising
a lower pivoting assembly with its rear end pivotally supported by said upwardly extending supporting portion and its forward end pivotally supporting said downwardly extending portion, said downwardly extending portion having a transverse generally vertical wall with a central opening therethrough,
an upper pivoting assembly with its rear end pivotally supported by said upwardly extending supporting portion and having a forward end,
a lever assembly comprising a pair of lever arms with their upper ends pivotally supported by said downwardly extending portion, the forward end of said upper pivoting assembly being pivoted to said lever arms therebelow, and a transverse plate joining still lower portions of said lever arms, said plate having a central opening aligned with the central opening of said transverse wall,
a spring mounting shaft having an adjustment handle at its forward end and extending rearwardly through said central opening of said transverse wall and then through and beyond said central opening of said plate,
a bearing washer adjustably threaded to the rear end of said spring mounting shaft,
means securing said bearing washer against rotation, and
a pair of springs means around said spring mounting shaft, namely forward spring means between and bearing on said transverse wall and said plate, and rear spring means between and bearing on said plate and said bearing washer.

2. The vehicle seat of claim 1 wherein each of said pair of spring means is a frustoconical metal spring.

3. The vehicle seat of claim 1 wherein a telescoping shock absorber is pivotally connected at a lower end to said base assembly and is pivotally connected at an upper end to said upper pivoting assembly.

4. A vehicle seat, including in combination:
a base assembly secured to the floor of the vehicle and having a vertical supporting portion,
a seat assembly spaced from said base assembly and including a seat frame having a vertical depending portion with a transverse wall having a central opening and a side wall having an arcuate slot therethrough, and two back frame uprights, one at each side, each having a lower arcuate gear-toothed edge with a thin sheet metal pan secured to and between said uprights,
an air spring interposed between said base plate and said seat frame, said air spring having a pneumatic conduit connected therethrough,
a lower pivoting assembly with its rear end pivotally supported by said vertical supporting portion and its forward end pivotally supporting said vertical depending portion,
an upper pivoting assembly with its rear end pivotally supported by said vertical supporting portion and having a forward end,
a lever assembly comprising a pair of lever arms with their upper ends pivotally supported by said depending portion, the forward end of said upper pivoting assembly being pivoted to said lever arms therebelow, and a transverse plate joining still lower portions of said lever arms, said plate having a central opening aligned with the central opening of said transverse wall,
a spring mounting shaft having an adjustment handle at its forward end and extending rearwardly through said central opening of said transverse wall and then through and beyond said central opening of said plate,
a bearing washer adjustably threaded to the rear end of said spring mounting shaft,
means securing said bearing washer against rotation,
a pair of springs around said spring mounting shaft, namely a forward spring between and bearing on said transverse wall and said plate, and a rear spring between and bearing on said plate and said bearing washer, a valve having a housing supported by said base assembly and connected to said pneumatic conduit and also to a supply of compressed air and having a bleed opening and a plunger controlling a valve member having a neutral position sealing off said conduit, a lower position connecting said conduit to said supply, and an upper position connecting said conduit to said bleed opening, said plunger having extreme upper and lower positions, a channel-shaped control arm having an upper surface and two depending flanges and carrying a first pin, a second pin pivotally secured to said plunger at its upper end, and an arcuate slot in between them, said valve housing having a third pin extending across said slot, spring means connecting said first pin to said base assembly, a lever arm pivotally secured to said vertical side wall, having at its rear end a pin engaging said upper surface of said control arm, and extending through said slot in said vertical side wall and having a forward end for manipulation by a person in said seat, and brake means normally holding said lever arm in the position in which it was last manually set, regardless of vertical movement of said seat assembly, a rigid torsion rod extending through and journaled on said seat frame and rotatably supporting said back frame uprights thereon, a pair of lockup fingers secured to said rod, one adjacent each said upright and carrying a fourth pin, a pair of lockup sectors, each having an arcuate gear sector engagement with a said gear-toothed edge, and having an arcuate slot through which said fourth pin extends, a pair of stub shafts each secured to said seat frame and pivotally supporting a said lockup sector, spring means joining each said stub shaft to a said lockup finger and urging said gear sector into engagement with its associated said gear-toothed edge, and crank means secured to said rod for rotating of said rod to disengage said gear sector from said gear-toothed edge and enable adjustment of the inclination of said back.

5. The vehicle seat of claim 4 wherein said seat frame comprises a lower frame assembly having said vertical depending portion and bearing on said air spring, an upper frame assembly supporting said torsion rod, and a fore-and-aft adjustment assembly joining said lower frame assembly to said upper frame assembly and having means for releasably locking them together at various fore-and-aft relationships relative to each other.

6. A vehicle seat, including in combination:

a base assembly secured to the floor of the vehicle and having a horizontal portion and an upwardly extending supporting portion, a seat assembly spaced from said base assembly and including a seat frame having a horizontal portion and a downwardly extending portion, and a seat supported by said frame, an air spring resting on said horizontal portion of said base assembly and secured to said horizontal portion of said seat assembly and supporting said seat assembly, and yieldable pitch-resisting means operably interconnecting said upwardly extending portion of said base assembly with said downwardly extending portion of said seat assembly, comprising at least one lever pivoted to and depending from said horizontal seat frame portion between said downwardly extending seat frame portion and said upwardly extending supporting portion of the base assembly, means pivotally connected to said lever at a point spaced from said horizontal seat frame portion for restraining fore-and-aft movement of the lever at said point, and spring means connected to the lever and to said downwardly extending portion for yieldably resisting pivoting of the lever about said point and thereby yieldably resisting fore-and-aft movement of the seat assembly substantially independent of vertical movement of said seat assembly, manually operated means for adjusting the amount of air in said air spring to place said seat at a desired elevation and weight-actuated means responsive to a change in the weight bearing on said seat for changing the amount of air in said air spring by an amount sufficient to retain said air spring in the position to which it had last been set by said manually operated means.

7. A vehicle seat, including in combination:

a base assembly secured to the floor of the vehicle and having a vertical supporting portion, a seat frame assembly spaced from said base assembly and having a vertical depending portion with a transverse wall having a central opening and a side wall having an arcuate slot therethrough, an air spring interposed between said base plate and said seat frame assembly, said air spring having a pneumatic conduit connected thereto, a lower pivoting assembly with its rear end pivotally supported by said vertical supporting portion and its forward end pivotally supporting said vertical depending portion, an upper pivoting assembly with its rear end pivotally supported by said vertical supporting portion and having a forward end, a lever assembly comprising a pair of lever arms with their upper ends pivotally supported by said depending portion, the forward end of said upper pivoting assembly being pivoted to said lever arms therebelow, and a transverse plate joining still lower portions of said lever arms, said plate having a central opening aligned with the central opening of said transverse wall, a spring mounting shaft having an adjustment handle at its forward end and extending rearwardly through said central opening of said transverse wall and then through and beyond said central opening of said plate, a bearing washer adjustably threaded to the rear end of said spring mounting shaft, means securing said bearing washer against rotation, a pair of frustoconical springs around said spring mounting shaft, namely a forward spring between and bearing on said transverse wall and said plate, and a rear spring between and bearing on said plate and said bearing washer a valve having a housing supported by said base assembly and connected to said pneumatic conduit and also to a supply of compressed air and having a bleed opening and a plunger controlling a valve member having a neutral position sealing off said conduit, a lower position connecting said conduit to said supply, and an upper position connecting said conduit to said bleed opening, said plunger having extreme upper and lower positions, a channel-shaped control arm having an upper surface and two depending flanges and carrying a first pin and a second pin pivotally secured to said plunger at its upper end, and an arcuate slot in between them, said valve housing having a third pin extending across said slot, spring means connecting said first pin to said base assembly, a lever arm pivotally secured to said vertical side wall, having at its rear end a pin engaging said upper surface of said control arm, and extending through said slot in said vertical side wall and having a forward end for manipulation by a person in said seat, and brake means normally holding said lever arm in the position in which it was last manually set, regardless of vertical movement of said frame assembly.

8. The vehicle seat of claim 7 having a shock absorber pivotally connected at a lower end to said base assembly and pivotally connected at an upper end to said upper pivoting assembly, in between its rear end and its forward end.

9. A vehicle seat, including in combination:

a base assembly secured to the floor of the vehicle and having a vertical supporting portion, a seat frame spaced from said base assembly and having a vertical depending portion with a transverse wall having a central opening, seat supporting spring means interposed between said base plate and said seat frame, a lower pivoting assembly with its rear end pivotally supported by said vertical supporting portion and its forward end pivotally supporting said vertical depending portion, an upper pivoting assembly with its rear end pivotally supported by said vertical supporting portion and having a forward end, a lever assembly comprising a pair of lever arms with their upper ends pivotally supported by said depending portion, the forward end of said upper pivoting assembly being pivoted to said lever arms therebelow, and a transverse plate joining still lower portions of said lever arms, said plate having a central opening aligned with the central opening of said transverse wall, a spring mounting shaft having an adjustment handle at its forward end and extending rearwardly through said central opening of said transverse wall and then through and beyond said central opening of said plate, a bearing washer adjustably threaded to the rear end of said spring mounting shaft, means securing said bearing washer against rotation, and a pair of springs around said spring mounting shaft, namely a forward spring between and bearing on said transverse wall and said plate, and a rear spring between and bearing on said plate and said bearing washer.

10. The vehicle seat of claim 9 wherein a telescoping shock absorber is pivotally connected at a lower end to said base assembly and is pivotally connected at an upper end to said upper pivoting assembly.

11. A vehicle seat, including in combination:

a base assembly secured to the floor of the vehicle and including a base plate and vertical rear standard including a pair of side walls supporting a rear upper horizontal shaft and a rear lower horizontal shaft thereacross, a seat assembly spaced from said base assembly and including a seat frame having a channel-shaped forward member having a front wall and two rearwardly extending side walls, said front wall having a central opening, said side walls supporting a forward upper horizontal shaft and a forward lower horizontal shaft thereacross, an air spring vertically disposed between said base plate and said seat frame, a lower pivoting assembly pivoted at its rear end to said rear lower shaft and pivoted at its forward end to said forward lower shaft, an upper pivoting assembly pivoted at its rear end to said rear upper shaft and having a forward end, a lever assembly comprising a pair of lever arms pivoted at their upper ends to said forward upper shaft, the forward end of said upper pivoting assembly being pivoted to said lever arms therebelow, and a plate joining still lower portions of said lever arms, said plate having a central opening aligned with the central opening of said front wall, a spring mounting shaft having an adjustment handle at its forward end and extending rearwardly through said central opening of said front wall and then through and beyond said central opening of said plate, a bearing washer adjustably threaded to the rear end of said spring mounting shaft, means securing said bearing washer against rotation when said shaft is rotated by said adjustment handle, and a pair of frustoconical springs around said spring mounting shaft, namely a forward spring between and bearing on said front wall and said plate, and a rear spring between and bearing on said plate and said bearing washer.

12. A vehicle seat, including in combination:

a base assembly secured to the floor of the vehicle and including a pair of vertical side walls, each side wall supporting an upper rear bearing and a lower rear bearing, a seat assembly spaced from said base assembly and including a seat frame having a channel-shaped forward member having a front wall and two rearwardly extending side walls, said front wall having a central opening, said side walls each supporting an upper forward bearing and a lower forward bearing, an air spring resting on said base assembly and secured to and supporting said seat assembly, a lower generally rectangular pivoting assembly comprising a rear shaft and a forward shaft rigidly connected together, means for rotatably supporting said rear shaft with respect to said lower rear bearings, means for rotatably supporting said forward shaft with respect to said lower forward bearings, an upper generally rectangular pivoting assembly comprising a back shaft and a front shaft rigidly connected together, means for rotatably supporting said back shaft with respect to said upper rear bearings, a lever assembly comprising a lever shaft, a pair of lever arms joined at their upper ends by said lever shaft and each having below said shaft a lever bearing, and a plate joining the lower portions of said lever arms, and having a central opening therethrough aligned with the central opening of said front wall, means for rotatably supporting said lever shaft, with respect to said upper forward bearings, means for rotatably supporting said front shaft with respect to said lever bearings, a spring mounting shaft having a handle at its forward end and extending rearwardly through said central opening of said front wall and then through and beyond said central opening of said plate, a bearing washer adjustably threaded to the rear end of said spring mounting shaft, means securing said bearing washer against rotation, and a pair of frustoconical springs around said spring mounting shaft, namely, a forward spring between and bearing on said front wall and said plate, and a rear spring between and bearing on said plate and said bearing washer.

13. The vehicle seat of claim 12 having a telescoping shock absorber pivotally connected at its lower end to said base assembly and at its upper end to said upper pivoting assembly in between said back shaft and said front shaft.

14. A vehicle seat, including in combination:
a base assembly secured to the floor of the vehicle and including a base plate and vertical rear standard including a pair of side walls, each side wall having a pair of bearing openings mounting an upper rear bearing and a lower rear bearing, a seat assembly spaced from said base assembly and including a seat frame having a generally horizontal portion and a channel-shaped forward member having a front wall and two rearwardly extending side walls, said front wall having a central opening, said side walls each having a pair of bearing openings mounting an upper forward bearing and a lower forward bearing, a lower generally rectangular pivoting assembly comprising a hollow rear shaft, a hollow forward shaft and a pair of links rigidly connecting said shafts, a first solid shaft supported by said lower rear bearings for rotatably supporting said hollow rear shaft therearound, a second solid shaft supported by said lower forward bearings for rotatably supporting said hollow forward shaft therearound, an upper generally rectangular pivoting assembly comprising a hollow back shaft, a hollow front shaft, and a pair of links rigidly connecting these said shafts, a third solid shaft inside said hollow back shaft and supported by said upper rear bearings for rotatably supporting said back shaft, a lever assembly comprising a hollow lever shaft, a pair of lever arms joined at their upper ends by said lever shaft and each having below said shaft a lever bearing, and a plate joining the lower portions of said lever arms, and having a central opening therethrough aligned with the central opening of said front wall, a fourth solid shaft supported by said upper forward bearings and surrounded by and rotatably supporting said hollow lever shaft, a fifth solid shaft supported by said lever bearings and surrounded by and rotatably supporting said hollow front shaft, a spring-mounting horizontal shaft having a handle at its forward end and extending rearwardly through said central opening of said front wall and then through and beyond said central opening of said plate, a bearing washer adjustably threaded to the rear end of said spring mounting shaft, means securing said bearing washer against rotation, a pair of frustoconical springs around said spring mounting shaft, namely a forward spring between and bearing on said front wall and said plate, and a rear spring between and bearing on said plate and said bearing washer, and an air spring resting on said base plate and secured to said generally horizontal portion of said seat assembly.

15. The vehicle seat of claim 14 having a telescoping shock absorber pivotally supported at its lower end by said base plate and having a hollow shaft at its upper end, a sixth solid shaft supported by the links of said upper pivoting assembly in between said back shaft and said forward shaft and surrounded by and rotatably supporting the hollow shaft of said shock absorber.

16. A vehicle seat, including in combination:
a base assembly secured to the floor of the vehicle and having a horizontal portion and an upwardly extending supporting portion, a seat assembly spaced from said base assembly and including a seat frame having a horizontal portion and a downwardly extending portion and a seat supported by said frame, an air spring resting on said horizontal portion of said base assembly and secured to said horizontal portion of said seat assembly and supporting said seat assembly and seat, yieldable, adjustable, spring-operated pitch-resisting means operably interconnecting said upwardly extending portion of said base assembly with said downwardly extending portion of said seat assembly, enabling limited and dampened fore-and-aft movement of said seat assembly substantially independent of vertical movement of said seat assembly, manually operated means for adjusting the amount of air in said air spring to place said seat at a desired elevation, weight-actuated means responsive to a change in the weight bearing on said seat for changing the amount of air in said air spring by an amount sufficient to retain said air spring in the position to which it had last been set by said manually operated means, two back frame uprights, one at each side, rotatably supported by said seat frame each having a lower arcuate gear-toothed edge, a thin sheet metal pan secured to and between said uprights, a pair of lockup sectors pivotally mounted to said seat frame, each having a gear sector for engagement with a said gear-toothed edge, engagement means urging each said gear sector into engagement with its associated said gear-toothed edge, and manually operated disengagement means for disengaging both said gear sectors from said gear-toothed edges to enable adjustment of the inclination of said back.

17. A vehicle seat, including in combination:
a base assembly secured to the floor of the vehicle and having a horizontal portion and an upwardly extending supporting portion,
a seat assembly spaced from said base assembly and including a seat frame having a horizontal portion and a downwardly extending portion and a seat supported by said frame,
an air spring resting on said horizontal portion of said base assembly and secured to said horizontal portion of said seat assembly and supporting said seat assembly and seat,
yieldable, adjustable, spring-operated pitch-resisting means operably interconnecting said upwardly extending portion of said base assembly with said downwardly extending portion of said seat assembly, enabling limited and dampened fore-and-aft movement of said seat assembly substantially independent of vertical movement of said seat assembly,
said pitch-resisting means including at least one lever pivoted to and depending from said horizontal seat frame portion between said downwardly extending seat frame portion and said upwardly extending supporting portion of the base assembly, means pivotally connected to the lever at a point spaced from said horizontal seat frame portion for restraining fore-and-aft movement of the lever at said point, and spring means connected to the lever and to said downwardly extending portion for yieldably resisting pivoting of the lever about said point and thereby yieldably resisting fore-and-aft movement of the seat assembly,
manually operated means for adjusting the amount of air in said air spring to place said seat at a desired elevation,
weight-actuated means responsive to a change in the weight bearing on said seat for changing the amount of air in said air spring by an amount sufficient to retain said air spring in the position to which it had last been set by said manually operated means,
two back frame uprights, one at each side, rotatably supported by said seat frame each having a lower arcuate gear-toothed edge,
a thin sheet metal pan secured to and between said uprights,
a pair of lockup sectors pivotally mounted to said seat frame, each having a gear sector for engagement with a said gear-toothed edge,
engagement means urging each said gear sector into engagement with its associated said gear-toothed edge, and
manually operated disengagement means for disengaging both said gear sectors from said gear-toothed edges to enable adjustment of the inclination of said back.

18. A vehicle seat, including in combination:
a base assembly secured to the floor of the vehicle and having a horizontal portion and an upwardly extending supporting portion,
a seat assembly spaced from said base assembly and including a seat frame having a horizontal portion and a downwardly extending portion and a seat supported by said frame,
an air spring resting on said horizontal portion of said base assembly and secured to said horizontal portion of said seat assembly and supporting said seat assembly and seat,
yieldable, adjustable, spring-operated pitch-resisting means operably interconnecting said upwardly extending portion of said base assembly with said downwardly extending portion of said seat assembly, enabling limited and dampened fore-and-aft movement of said seat assembly substantially independent of vertical movement of said seat assembly,
manually operated means for adjusting the amount of air in said air spring to place said seat at a desired elevation, said manually operated means and weight-actuated means comprising:
a valve having a housing supported by said base assembly and connected by pneumatic conduit to said air spring and also to a supply of compressed air and having a bleed opening and a plunger controlling a valve member having a neutral position sealing off said conduit, a lower position connecting said conduit to said supply, and an upper position connecting said conduit to said bleed opening, said plunger having extreme upper and lower positions,
a control arm connected at a first pivot point to the upper end of said plunger with spring means connected to one end of the control arm and to the base assembly for urging said one end downwardly, and means anchored to the base assembly normally supporting the control arm at a second pivot point between the first pivot point and said one end of the control arm,
a lever arm pivotally secured to said seat assembly along a generally horizontal axis and having at its rear end a projection engaging the upper surface of said control arm near an end of the control arm opposite said one end, so that downward movement of said projection moves said opposite end of the control arm downwardly, said lever arm having a forward end for manipulation by a person in said seat, and
brake means normally holding said lever arm in the position in which it was last manually set, regardless of vertical movement of said seat assembly,
weight-actuated means responsive to a change in the weight bearing on said seat for changing the amount of air in said air spring by an amount sufficient to retain said air spring in the position to which it had last been set by said manually operated means,
two back frame uprights, one at each side, rotatably supported by said seat frame each having a lower arcuate gear-toothed edge,
a thin sheet metal pan secured to and between said uprights,
a pair of lockup sectors pivotally mounted to said seat frame, each having a gear sector for engagement with a said gear-toothed edge,
engagement means urging each said gear sector into engagement with its associated said gear-toothed edge, and
manually operated disengagement means for disengaging both said gear sectors from said gear-toothed edges to enable adjustment of the inclination of said back.

19. A vehicle seat, including in combination:

a base assembly secured to the floor of the vehicle and having a vertical supporting portion, a seat frame assembly spaced from said base assembly and having a vertical depending portion with a transverse wall having a central opening, an air spring interposed between said base plate and said seat frame assembly, said air spring having a pneumatic conduit connected thereto, a lower pivoting assembly with its rear end pivotally supported by said vertical supporting portion and its forward end pivotally supporting said vertical depending portion, an upper pivoting assembly with its rear end pivotally supported by said vertical supporting portion and having a forward end, a lever assembly comprising a pair of lever arms with their upper ends pivotally supported by said depending portion, the forward end of said upper pivoting assembly being pivoted to said lever arms therebelow, and a transverse plate joining still lower portions of said lever arms, said plate having a central opening aligned with the central opening of said transverse wall, a spring mounting shaft having an adjustment handle at its forward end and extending rearwardly through said central opening of said transverse wall and then through and beyond said central opening of said plate, a bearing washer supported by the rear end of said spring mounting shaft, means associated with said spring mounting shaft, said transverse wall and said bearing washer for axially adjusting the position of the bearing washer in response to rotation of the adjustment handle, a pair of compression springs around said spring mounting shaft, one positioned between and bearing on said transverse wall and said plate, and the other between and bearing on said plate and said bearing washer, a valve having a housing supported by said base assembly and connected to said pneumatic conduit and also to a supply of compressed air and having a bleed opening and a plunger controlling a valve member having a neutral position sealing off said conduit, a lower position connecting said conduit to said supply, and an upper position connecting said conduit to said bleed opening, said plunger having extreme upper and lower positions, a control arm connected at a first pivot point to the upper end of said plunger with spring means connected to one end and to the base assembly for urging said one end downwardly, and means anchored to the base assembly normally supporting the control arm at a second pivot point between the first pivot point and said one end of the control arm, a lever arm pivotally secured to said seat assembly along a generally horizontal axis and having at its rear end a projection engaging the upper surface of said control arm near an end of the control arm opposite said one end, so that downward movement of said projection moves said opposite end of the control arm downwardly, said lever arm having a forward end for manipulation by a person in said seat, and brake means normally holding said lever arm in the position in which it was last manually set, regardless of vertical movement of said seat assembly.

20. A vehicle seat, including in combination:

a base assembly secured to the floor of the vehicle and having a vertical supporting portion, a seat frame spaced from said base assembly and having a vertical depending portion with a transverse wall having a central opening, seat supporting spring means interposed between said base plate and said seat frame, a lower pivoting assembly with its rear end pivotally supported by said vertical supporting portion and its forward end pivotally supporting said vertical depending portion, an upper pivoting assembly with its rear end pivotally supported by said vertical supporting portion and having a forward end, a lever assembly comprising a pair of lever arms with their upper ends pivotally supported by said depending portion, the forward end of said upper pivoting assembly being pivoted to said lever arms therebelow, and a transverse plate joining still lower portions of said lever arms, said plate having a central opening aligned with the central opening of said transverse wall, a spring mounting shaft having an adjustment handle at its forward end and extending rearwardly through said central opening of said transverse wall and then through and beyond said central opening of said plate, a bearing washer supported by the rear end of said spring mounting shaft, means associated with said spring mounting shaft, said bearing washer and said transverse wall for adjusting the axial position of the washer in response to rotation of the adjustment handle, and a pair of springs around said spring mounting shaft, namely a forward spring between and bearing on said transverse wall and said plate, and a rear spring between and bearing on said plate and said bearing washer.

21. A vehicle seat, including in combination:

a base assembly secured to the floor of the vehicle, a seat assembly spaced from said base assembly and including a seat frame, an air spring resting on said base assembly and secured to and supporting said seat assembly, said air spring having a pneumatic conduit connected thereto, a valve having a housing supported by said base assembly and connected to said pneumatic conduit and also to a supply of compressed air and having a bleed opening and a plunger controlling a valve member having a neutral position sealing off said conduit, a lower position connecting said conduit to said supply, and an upper position connecting said conduit to said bleed opening, said plunger having extreme upper and lower positions, a control arm connected at a first pivot point to the upper end of said plunger for rotation in a generally vertical plane, with springs means connected to one end of the control arm and to the base assembly for urging said one end downwardly, and means anchored to the base assembly normally supporting the control arm at a second pivot point between the first pivot point and said one end of the control arm, a lever arm pivotally secured to said seat assembly for pivotal movement in a generally vertical plane and having at its rear end a projection engaging the upper surface of said control arm near an end of the control arm opposite said one end, so that downward movement of said projection moves said opposite end of the control arm downwardly, said lever arm having a forward end for manipulation by a person in said seat, and brake means normally holding said lever arm in the position in which it was last manually set, regardless of vertical movement of said seat assembly, whereby said lever arm can be manually operated to cause rotation of said control arm and thereby actuate said plunger to supply air to or bleed air from said air spring and thereby regulate the height of said seat, and whereby said lever arm also moves up and down with said seat for automatically responding to a change in weight on said seat to cause said control arm to actuate said plunger for adjusting the pressure in said air spring to retain or return the seat to the height to which the seat was latest manually adjusted, said control arm, upon said plunger having reached an extreme lower position, thereafter lifting off said second pivot point and pivoting around said first pivot point, and upon said plunger having reached an extreme upper position, thereafter remaining stationary as the lever arm continues upwardly.

* * * * *

UNITED STATES PATENT AND TRADEMARK OFFICE
CERTIFICATE OF CORRECTION

PATENT NO. : 3,999,800
DATED : December 28, 1976
INVENTOR(S) : Roger Paul Penzotti It is certified that error appears in the above-identified patent and that said Letters Patent are hereby corrected as shown below:

Item [73] of left-hand column of first page, "Paccar Inc." should read --PACCAR Inc--.

Column 4, line 56, delete the repetition of "The lower seat assembly 25(FIGS.1-4)"

Column 10, line 48, "rubbers washers" should read --rubber washers--

Column 11, line 27, "place seat" should read --place said seat--

Column 13, line 33, "sector engagement" should read --sector for engagement--

Column 20, line 15, "means and" should read --means and said--

Column 22, line 58, "springs" should read --spring--

Signed and Sealed this

Fourteenth Day of March 1978

[SEAL]

Attest:

RUTH C. MASON
Attesting Officer

LUTRELLE F. PARKER
Acting Commissioner of Patents and Trademarks